US012553983B2

(12) United States Patent
Carlak et al.

(10) Patent No.: US 12,553,983 B2
(45) Date of Patent: Feb. 17, 2026

(54) HYBRID POSITIONING SYSTEM FOR DETERMINING A PRECISE POSITION OF A VEHICLE

(71) Applicants: GM Global Technology Operations LLC, Detroit, MI (US); Regents of the University of Michigan, Ann Arbor, MI (US)

(72) Inventors: Can Carlak, Ann Arbor, MI (US); Xueshen Liu, Ann Arbor, MI (US); Bo Yu, Novi, MI (US); Fan Bai, Ann Arbor, MI (US); Zhuoqing Morley Mao, Ann Arbor, MI (US)

(73) Assignees: GM GLOBAL TECHNOLOGY OPERATIONS LLC, Detroit, MI (US); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 411 days.

(21) Appl. No.: 18/168,154

(22) Filed: Feb. 13, 2023

(65) Prior Publication Data
US 2024/0272266 A1 Aug. 15, 2024

(51) Int. Cl.
*G01S 5/02* (2010.01)
*G01S 5/04* (2006.01)
(Continued)

(52) U.S. Cl.
CPC .......... *G01S 5/0268* (2013.01); *G01S 5/0284* (2013.01); *G01S 5/04* (2013.01); *G01S 5/0036* (2013.01);
(Continued)

(58) Field of Classification Search
CPC .... G01S 5/0268; G01S 5/2089; G01S 5/0036; G01S 5/0054; G01S 5/0284; G01S 5/04;
(Continued)

(56) References Cited

U.S. PATENT DOCUMENTS 9,470,531 B2 * 10/2016 Moerman ............. G01S 5/0072
9,734,714 B1 * 8/2017 Fan ................... G08G 1/096791
(Continued)

FOREIGN PATENT DOCUMENTS

JP 2010003246 A * 1/2010 ............... G08G 1/09
WO WO-2025014486 A1 * 1/2025 ............. G01S 19/46

OTHER PUBLICATIONS

A. Kakkavas, M. H. Castañeda Garcia, R. A. Stirling-Gallacher and J. A. Nossek, "Multi-Array 5G V2V Relative Positioning: Performance Bounds," 2018 IEEE Global Communications Conference (GLOBECOM), 2018, pp. 206-212, doi: 10.1109/GLOCOM.2018.8647812.
(Continued)

*Primary Examiner* — Chuong P Nguyen
(74) *Attorney, Agent, or Firm* — Vivacqua Crane, PLLC (57) ABSTRACT

A hybrid positioning system for a vehicle includes one or more controllers in wireless communication with a plurality of surrounding vehicles located in an environment surrounding the vehicle and a cellular software defined network including an edge positioning function. The one or more controllers execute instructions to receive, from the plurality of surrounding vehicles, relative position measurements that are each indicative of a position of one of the plurality of surrounding vehicles relative to the vehicle, wherein the relative position measurements are received by the one or more controllers in real-time. The one or more controllers receive a precise global position of the vehicle and the plurality of surrounding vehicles from the edge positioning function of the cellular software defined network, and fuse together the relative position measurements and the precise global position of the vehicle to determine a precise position of the vehicle.

20 Claims, 5 Drawing Sheets

(51) Int. Cl.
G01S 5/00 (2006.01)
G01S 19/42 (2010.01)
G01S 19/51 (2010.01)

(52) U.S. Cl.
CPC .............. *G01S 5/0054* (2013.01); *G01S 19/42* (2013.01); *G01S 19/51* (2013.01)

(58) Field of Classification Search
CPC ........ G01S 19/51; G01S 19/42; H04W 4/029; H04W 4/40
USPC ............... 342/463, 450, 457, 357.34, 357.25
See application file for complete search history.

(56) References Cited

U.S. PATENT DOCUMENTS

| | | | | |
|---|---|---|---|---|
| 10,281,925 | B2* | 5/2019 | Sakr | G05D 1/0276 |
| 10,466,366 | B2* | 11/2019 | Lee | G01S 19/51 |
| 10,473,793 | B2* | 11/2019 | Neubecker | G01S 19/46 |
| 11,550,066 | B2* | 1/2023 | Bagheri | G01C 21/30 |
| 11,595,938 | B2* | 2/2023 | Bao | H04W 64/00 |
| 2018/0190125 | A1* | 7/2018 | Hayee | G08G 1/167 |
| 2019/0279513 | A1* | 9/2019 | Schuh | G08G 1/22 |

OTHER PUBLICATIONS

Ananthasubramaniam, B. and Madhow, U. "Cooperative localization using angle of arrival measurements in non-line-of-sight environments," in Proceedings of the first ACM international workshop on Mobile entity localization and tracking in GPS-less environments (MELT '08), Association for Computing Machinery, New York, NY, USA, 2008, doi: 10.1145/1410012.1410040.
E. Y. Menta, N. Malm, R. Jantti, K. Ruttik, M. Costa and K. Leppänen, "On the Performance of AoA-Based Localization in 5G Ultra-Dense Networks," in IEEE Access, 2019, vol. 7, p. 33870-33880, 2019, doi: 10.1109/ACCESS.2019.2903633.
G. Wan et al., "Robust and Precise Vehicle Localization Based on Multi-Sensor Fusion in Diverse City Scenes," 2018 IEEE International Conference on Robotics and Automation (ICRA), 2018, pp. 4670-4677, doi: 10.1109/ICRA.2018.8461224.
H. Wymeersch, G. Seco-Granados, G. Destino, D. Dardari and F. Tufvesson, "5G mmWave Positioning for Vehicular Networks," in IEEE Wireless Communications, vol. 24, No. 6, pp. 80-86, Dec. 2017, doi: 10.1109/MWC.2017.1600374.
J. Xu, M. Ma, C. Law, "Cooperative angle-of-arrival position localization," Measurement, vol. 59, 2015, pp. 302-313.
Koivisto, M., Costa, M., Werner, J., Heiska, K., Talvitie, J., Leppanen, K., Koivunen, V., & Valkama, M. "Joint Device Positioning and Clock Synchronization in 5G Ultra-Dense Networks," 2016, arXiv, doi: 10.48550/arXiv.1604.03322.
M. H. C. Garcia et al., "A Tutorial on 5G NR V2X Communications," in IEEE Communications Surveys & Tutorials, vol. 23, No. 3, pp. 1972-2026, third quarter 2021, doi: 10.1109/COMST.2021.3057017.
M. Koivisto, A. Hakkarainen, M. Costa, P. Kela, K. Leppanen and M. Valkama, "High-Efficiency Device Positioning and Location-Aware Communications in Dense 5G Networks," in IEEE Communications Magazine, vol. 55, No. 8, pp. 188-195, Aug. 2017, doi: 10.1109/MCOM.2017.1600655.
Mogyorósi, F.; Revisnyei, P.; Pašić, A.; Papp, Z.; Toros, I.; Varga, P.; Pašić, A. Positioning in 5G and 6G Networks—A Survey. Sensors 2022, 22, 4757, doi: 10.3390/s22134757.
S. Bartoletti et al., "Positioning and Sensing for Vehicular Safety Applications in 5G and Beyond," in IEEE Communications Magazine, vol. 59, No. 11, pp. 15-21, Nov. 2021, doi: 10.1109/MCOM.011.2100339.
Zhang, W.; Yang, Y.; Zeng, A.; Xu, Y. "A GNSS/5G Integrated Three-Dimensional Positioning Scheme Based on D2D Communication," Remote Sens., 2022, doi: 10.3390/rs14061517.
Bai et al. "GNSS-5G Hybrid Positioning Based on Multi-Rate Measurements Fusion and Proactive Measurement Uncertainty Prediction," in IEEE Transactions on Instrumentation and Measurement, vol. 71, pp. 1-15, 2022, Art No. 8501415, doi: 10.1109/TIM.2022.3154821.

* cited by examiner

HYBRID POSITIONING SYSTEM FOR DETERMINING A PRECISE POSITION OF A VEHICLE

INTRODUCTION

The present disclosure relates to a hybrid positioning system for determining a precise position of a vehicle by fusing together real-time relative position measurements indicative of a position of a plurality of surrounding vehicles with a precise global position of the vehicle, which is holistically calculated by an edge positioning function of a cellular software defined network.

An autonomous vehicle executes various tasks such as, but not limited to, perception, localization, mapping, path planning, decision making, and motion control. The current approach for localization requires input from a variety of sources that include satellite navigation systems, vehicle motion sensors, range sensors, and vision sensors to determine a position of the autonomous vehicle. For example, a global positioning system (GPS) provides a geographical location of the autonomous vehicle.

There may be several challenges that exist when determining a precise position of the autonomous vehicle, especially in urban environments. The precise position of the autonomous vehicle provides lane-level accuracy of the autonomous vehicle's position, which includes an error of less than about one meter. It is to be appreciated that the geographical location provided by a GPS may not provide the lane-level accuracy required by an autonomous driving system. Furthermore, there are instances when an autonomous vehicle travels through a GPS-denied environment such as, for example, an urban canyon. An urban canyon is an area where a street is flanked by buildings on both sides to create a canyon-like environment. The buildings located on both sides of the street may block GPS signals from reaching the autonomous vehicle. Although alternative solutions to determine the geographical location of the autonomous vehicle in a GPS-denied environment exist, the alternative solutions may have limitations as well. For example, one alternative solution is to determine the position of a vehicle based on cellular signals such as fifth generation (5G) new radio (NR) positioning. However, the accuracy of the position calculated based on this approach may be affected when no line-of-sight exists between the autonomous vehicle and a base station.

Thus, while current localization systems for autonomous vehicles achieve their intended purpose, there is a need in the art for an improved approach for determining a precise position of a vehicle.

SUMMARY

According to several aspects, a hybrid positioning system for a vehicle is disclosed and includes one or more controllers in wireless communication with a plurality of surrounding vehicles located in an environment surrounding the vehicle and a cellular software defined network including an edge positioning function. The one or more controllers execute instructions to receive, from the plurality of surrounding vehicles, relative position measurements that are each indicative of a position of one of the plurality of surrounding vehicles relative to the vehicle. The relative position measurements are received by the one or more controllers in real-time. The one or more controllers receive a precise global position of the vehicle and the plurality of surrounding vehicles from the edge positioning function of the cellular software defined network. The one or more controllers fuse together the relative position measurements and the precise global position of the vehicle to determine a precise position of the vehicle.

In another aspect, the precise global position of the vehicle and the plurality of surrounding vehicles are holistically calculated based on a cooperative localization algorithm by the edge positioning function.

In yet another aspect, the cooperative localization algorithm is an angle of arrival cooperative localization algorithm that is based on a difference between two angle of arrival measurements received by one or more of the following: the vehicle and the plurality of surrounding vehicles.

In an aspect, the angle of arrival cooperative localization algorithm holistically calculates the precise global position of the vehicle and the plurality of surrounding vehicles based on the conjugate gradient method.

In another aspect, the one or more controllers fuse together the relative position measurements and the precise global position of the vehicle by saving the relative position measurements indicative of the surrounding vehicles relative to the vehicle in memory, where each relative position measurement includes a unique timestamp.

In yet another aspect, the one or more controllers fuse together the relative position measurements and the precise global position of the vehicle by comparing a timestamp of a most recent precise global position of the vehicle with the unique timestamp of each of the relative position measurements saved in the memory, selecting all relative position measurements having the unique timestamp that is more recent compared to the timestamp of the most recent precise global position of the vehicle, and fusing together the relative position measurements having the unique timestamp that is more recent than the timestamp of the most recent precise global position of the vehicle with the most recent precise global position of the vehicle.

In an aspect, the one or more controllers are in wireless communication with the plurality of surrounding vehicles by a vehicle-to-vehicle (V2V) communication network.

In another aspect, the one or more controllers are in wireless communication with the cellular software defined network by a vehicle-to-network (V2N) communication network.

In yet another aspect, the V2N communication network is based on a cellular communication protocol.

In an aspect, the hybrid positioning system is part of an automated driving system (ADS) or an advanced driver assistance system (ADAS).

In another aspect, the relative position measurements include one or more of the following: an angle of arrival (AoA), a time of arrival (ToA), and a round-trip time (RTT).

In an aspect, a method of determining a precise position of a vehicle by a hybrid positioning system is disclosed. The method includes receiving, by one or more controllers from a plurality of surrounding vehicles, relative position measurements that are each indicative of a position of one of the plurality of surrounding vehicles relative to the vehicle, where the relative position measurements are received by the one or more controllers in real-time. The method includes receiving, by the one or more controllers, a precise global position of the vehicle and the plurality of surrounding vehicles from an edge positioning function of a cellular software defined network. Finally, the method includes fusing together the relative position measurements and the precise global position of the vehicle to determine the precise position of the vehicle.

In another aspect, fusing together the relative position measurements and the precise global position of the vehicle includes saving the relative position measurements indicative of the plurality of surrounding vehicles relative to the vehicle in memory, where each relative position measurement includes a unique timestamp.

In yet another aspect, fusing together the relative position measurements and the precise global position of the vehicle includes comparing a timestamp of a most recent precise global position of the vehicle with the unique timestamp of each of the relative position measurements saved in the memory, selecting all relative position measurements having the unique timestamp that is more recent compared to the timestamp of the most recent precise global position of the vehicle, and fusing together the relative position measurements having the unique timestamp that is more recent than the timestamp of the most recent precise global position of the vehicle with the most recent precise global position of the vehicle.

In another aspect, a hybrid positioning system for a vehicle is disclosed and includes one or more controllers in wireless communication with a plurality of surrounding vehicles located in an environment surrounding the vehicle by a V2V communication network and a cellular software defined network including an edge positioning function by a V2N communication network. The one or more controllers execute instructions to receive, from the plurality of surrounding vehicles, relative position measurements that are each indicative of a position of one of the plurality of surrounding vehicles relative to the vehicle, where the relative position measurements are received by the one or more controllers in real-time. The one or more controllers receive a precise global position of the vehicle and the plurality of surrounding vehicles from the edge positioning function of the cellular software defined network, where the precise global position of the vehicle and the plurality of surrounding vehicles are holistically calculated based on a cooperative localization algorithm by the edge positioning function. The one or more controllers fuse together the relative position measurements and the precise global position of the vehicle to determine a precise position of the vehicle.

In another aspect, the cooperative localization algorithm is an angle of arrival cooperative localization algorithm that is based on a difference between two angle of arrival measurements received by one or more of the following: the vehicle and the plurality of surrounding vehicles.

In yet another aspect, the angle of arrival cooperative localization algorithm holistically calculates the precise global position of the vehicle and the plurality of surrounding vehicles based on the conjugate gradient method.

In an aspect, the one or more controllers fuse together the relative position measurements and the precise global position of the vehicle by saving the relative position measurements indicative of the surrounding vehicles relative to the vehicle in memory, where each relative position measurement includes a unique timestamp.

In another aspect, the one or more controllers fuse together the relative position measurements and the precise global position of the vehicle by comparing a timestamp of a most recent precise global position of the vehicle with the unique timestamp of each of the relative position measurements saved in the memory, selecting all relative position measurements having the unique timestamp that is more recent compared to the timestamp of the most recent precise global position of the vehicle and fusing together the relative position measurements having the unique timestamp that is more recent than the timestamp of the most recent precise global position of the vehicle with the most recent precise global position of the vehicle.

In yet another aspect, the V2N communication network is based on a cellular communication protocol.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
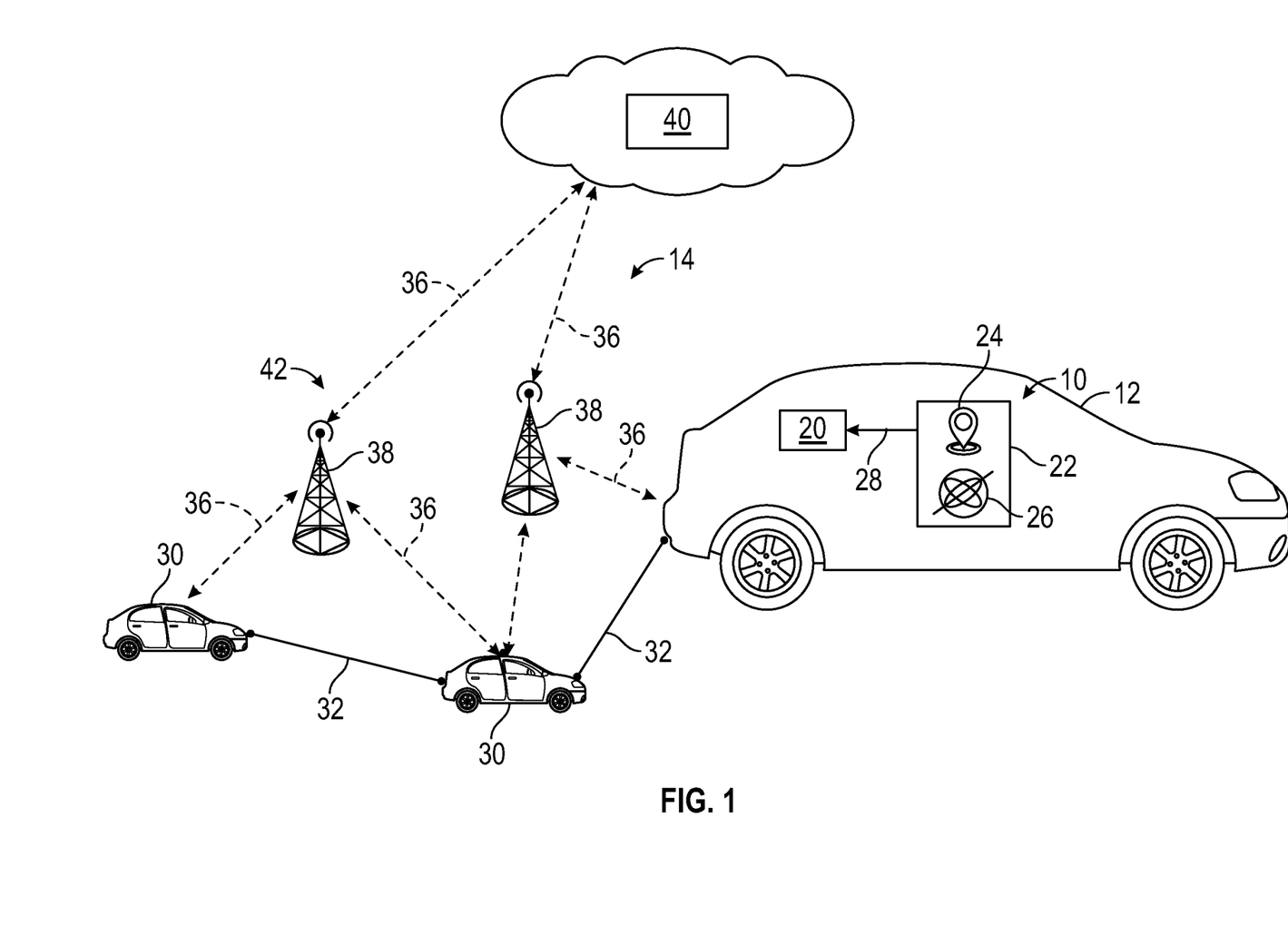
FIG. 1 is a schematic diagram of a vehicle including the disclosed hybrid positioning system, where the disclosed hybrid positioning system includes one or more controllers in wireless communication with a plurality of surrounding vehicles and a cellular software defined network, according to an exemplary embodiment.

Referring to FIG. 1, an exemplary hybrid positioning system 10 for determining a precise position of a vehicle 12 is illustrated. It is to be appreciated that the vehicle 12 may be any type of vehicle such as, but not limited to, a sedan, truck, sport utility vehicle, van, or motor home. In one embodiment, the vehicle 12 may be operated manually by an individual. Alternatively, in another embodiment, the hybrid positioning system 10 is part of an automated driving system (ADS) or an advanced driver assistance system (ADAS) for assisting a driver with steering, braking, and/or accelerating. The precise position of the vehicle 12 provides lane-level accuracy, which is required by an ADS or ADAS and includes an error of less than about one meter.

The hybrid positioning system 10 includes one or more controllers 20 in electronic communication with one or more positioning sensors 22 that collect data indicative of a current position 28 of the vehicle 12. In the embodiment as shown in FIG. 1, the one or more positioning sensors 22 include a global positioning system (GPS) 24 and an inertial measurement unit (IMU) 26, however, is to be appreciated that additional or different sensors may be included as well.

The one or more controllers 20 of the vehicle 12 is in wireless communication with a plurality of surrounding vehicles 30 located in an environment 14 surrounding the vehicle 12 by a vehicle-to-vehicle (V2V) communication network 32. As seen in FIG. 1, the plurality of surrounding vehicles 30 may also be in wireless communication with one another by the V2V communication network 32. The one or more controllers 20 of the vehicle 12 are also in wireless communication with a cellular software defined network 40 by a vehicle-to-network (V2N) communication network 36. Specifically, the V2N communication network 36 includes one or more base stations 38 that connect the one or more controllers 20 of the vehicle 12 as well as the surrounding vehicles 30 to the cellular software defined network 40. The one or more base stations 38 provide communication between vehicle 12 and the cellular software defined network 40 as well as the surrounding vehicles 30 and the cellular software defined network 40 in both the downlink and uplink directions. The vehicle 12, the surrounding vehicles 30, and the one or more base stations 38 may be referred to and represent a network of connected nodes 42. It is to be appreciated that the vehicle 12 may be referred to as a host or ego vehicle of the network of connected nodes 42.

Figure 2:
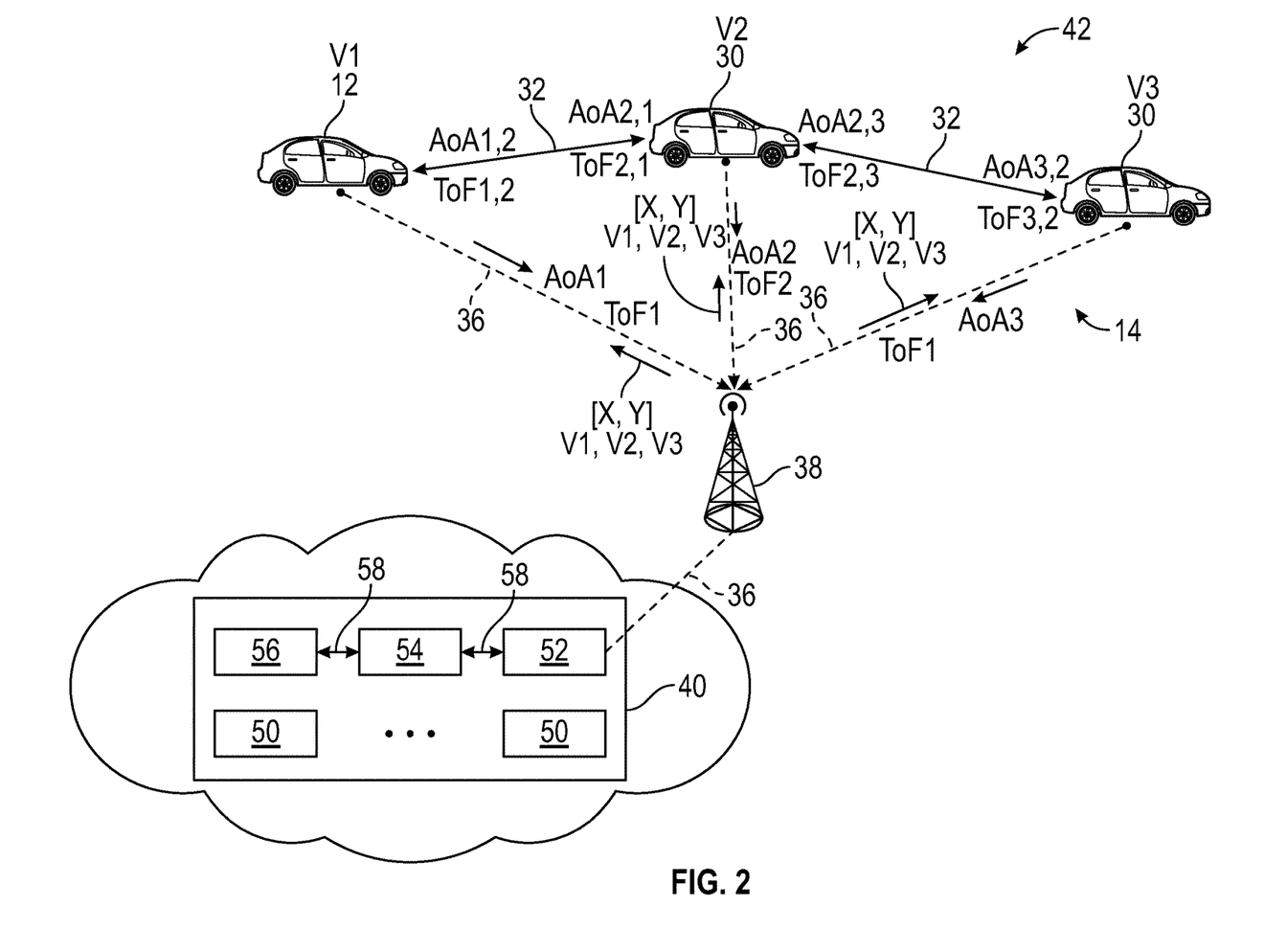
FIG. 2 is a data flow diagram illustrating information transmitted to and from the vehicle by a vehicle-to-vehicle (V2V) communication network and a vehicle-to-network (V2N) communication network, according to an exemplary embodiment.

FIG. 2 is a data flow diagram illustrating information transmitted to and from the V2V communication network 32 and the V2N communication network 36, where the vehicle 12 (i.e., the ego vehicle) is represented as V1, and the surrounding vehicles 30 are represented as V2 and V3. It is to be appreciated that while two vehicles V2 and V3 are illustrated as the surrounding vehicles 30, FIG. 2 is merely exemplary in nature and only two vehicles are shown for purposes of simplicity and clarity. Indeed, the network of connected nodes 42 may include more than two surrounding vehicles 30 in embodiments.

Referring to both FIGS. 1 and 2, the one or more controllers 20 of the vehicle 12 receive relative position measurements from the physical layer of the wireless signals transmitted by the V2V communication network 32. Each of the relative position measurements are indicative of a position of one of the surrounding vehicles V2, V3 relative to the ego vehicle V1 (or a base node, such as one of the base stations 38), and are received by the one or more controllers 20 of the vehicle 12 in real-time. It is to be appreciated that the surrounding vehicles V2 and V3 may also collect relative position measurements of the ego vehicle V1 (i.e., the vehicle 12) as well.

In one embodiment, the relative position measurements include angle-based positioning measurements such as, but not limited to, an angle of arrival (AoA). Furthermore, in an embodiment, the relative position measurements may also include delay-based positioning data such as, but not limited to, a time of arrival (ToA) and a round-trip time (RTT). In the example as shown in FIG. 2, the vehicle 12 (i.e., the ego vehicle V1) receives the angle of arrival and the time of arrival of a signal transmitted by the surrounding vehicle V2 and received by the ego vehicle V1 as AoA1,2 and ToF1,2. It is to be appreciated that the surrounding vehicle V2 may also receive the angle of arrival and a time of arrival of a signal transmitted by the ego vehicle V1 and received by the surrounding vehicle V2 as AoA2,1 and ToF2,1. The surrounding vehicle V2 also receives the angle of arrival and a time of arrival of a signal transmitted by the surrounding vehicle V3 and received by the surrounding vehicle V2 as AoA2,3 and ToF2,3. Finally, surrounding vehicle V3 receives the angle of arrival and a time of arrival of a signal transmitted by the surrounding vehicle V2 and received by the surrounding vehicle V3 as AoA3,2 and ToF3,2.

The V2N communication network 36 is based on a cellular communication protocol. In one non-limiting example, the cellular communication protocol is a fourth generation (4G) network, a fifth generation (5G) network, or a sixth generation (6G) network. However, it is to be appreciated that the V2N communication network 36 is not limited to a specific cellular communication protocol. The one or more controllers 20 of the vehicle 12 receive a precise global position X, Y of each of the vehicles 12, 30 that are part of the network of connected nodes 42 from the V2N communication network 36 are calculated holistically by an edge positioning function 56 that is part of the cellular software defined network 40. It is to be appreciated that the precise global positions X, Y of each of the vehicles 12, 30 that are part of the network of connected nodes 42 include a submeter level of accuracy, however, the precise global position X, Y also include a slower response time when compared to the V2V communication network 32 due to network latency.

In the embodiment as shown in FIG. 2 the cellular software defined network 40 is based on the 5G protocol. However, it is to be appreciated that illustration of the cellular software defined network 40 shown in FIG. 2 is merely exemplary in nature and is not limited to the 5G protocol. As seen in FIG. 2, the cellular software defined network 40 may include various network-based architecture features 50 that are specific to the 5G protocol such as, for example, network exposure function (NEF), network repository function (NRF), and policy control function (PCF). The cellular software defined network 40 may also include an access and mobility management function (AMF) 52, a location management function (LMF) 54, and the edge positioning function 56. As seen in FIG. 2, the AMF 52, and LMF 54, and the edge positioning function 56 are in wireless communication with one another by a wireless connection 58. In one non-limiting embodiment, the wireless connection 58 is an inter-network function link.

The AMF 52 of the cellular software defined network 40 receives the real-time relative position measurements of the vehicles 12, 30 that are part of the network of connected nodes 42 (e.g., AoA1,2 and ToF1,2) collected by the V2V communication network 32. The AMF 52 of the cellular software defined network 40 also receives stationary position measurements indicative of a position of the ego vehicle V1 and the surrounding vehicles V2, V3 relative to one of the base stations 38. The stationary position measurements include angle-based positioning measurements such as, but not limited to, the angle of arrival. In an embodiment, the stationary position measurements include delay-based positioning data such as, but not limited to, the time of arrival and the round-trip time. In the example as shown in FIG. 2, the AMF 52 of the cellular software defined network 40 receives the angle of arrival and the time of arrival of a signal transmitted by the vehicle 12 (i.e., the ego vehicle V1) as AoA1 and ToF1, a signal transmitted by the surrounding vehicle V2 as AoA2 and ToF2, and a signal transmitted by the surrounding vehicle V3 as AoA3 and ToF3.

The AMF 52 of the cellular software defined network 40 also receives connection and session related information from the vehicles 12, 30 that are part of the network of connected nodes 42. The AMF 52 is responsible for handling connection and mobility management related tasks. The LMF 54 of the cellular software defined network 40 receives the relative position measurements and the stationary position measurements of the vehicles 12, 30 that are part of the network of connected nodes 42. The edge positioning function 56 of the cellular software defined network 40 receives the relative position measurements and the stationary position measurements of the vehicles 12, 30 that are part of the network of connected nodes 42 from the LMF 54 and performs a holistic calculation to determine the precise position X, Y of each of the vehicles 12, 30 that are part of the network of connected nodes 42, which is described below.

The edge positioning function 56 collects and stores the relative position measurements and the stationary position measurements of the vehicles 12, 30 that are part of the network of connected nodes 42 as a multi-dimensional measurement m. Specifically, the multi-dimensional measurement m includes the relative position measurements (e.g., AoA1,2, ToF1,2), the stationary position measurements (e.g., AoA1, ToF1), and an estimated global position (e.g., x1, y1, z1) for a specific one of the vehicles 12, 30 that are part of the network of connected nodes 42 corresponding to a unique timestamp. The estimated global position of the specific one of the vehicles 12, 30 is estimated by the edge positioning function 56 and represents a current best estimate of the global position of the specific one of the vehicles 12, 30. For example, the multi-dimensional measurement m at an initial timestamp t1 would be [t1, x1, y1, z1, AoA1n1, ToF1n1, AoA1,2n1, Tof1,2n1] for the ego vehicle V1, and the multi-dimensional measurement m at a subsequent timestamp t2 would be [t2, x1, y1, z1, AoA2n1, ToF2n1, AoA2, 1n1, Tof2, 1n1] for the ego vehicle V1, where n #indicates the specific vehicle that a signal originates from.

It is to be appreciated that the relative position measurements and the stationary position measurements received by the cellular software defined network 40 from the vehicle 12 and the surrounding vehicles 30 may vary based on data rate and starting time because of issues such as, but not limited to, differences in device quality and network delay. In other words, the data received from the V2N communication network 36 is uploaded to the cellular software defined network 40 with a latency, and the data received from multiple sources (i.e., the different vehicles 12, 30) is not ordered sequentially with respect to one another. As a result, the edge positioning function 56 of the cellular software defined network 40 synchronizes the multi-dimensional measurements m corresponding to the vehicle 12 and the surrounding vehicles 30 onto the same time frame by executing one or more interpolation techniques. In one embodiment, the one or more interpolation techniques include linear interpolation and spline interpolation. In an embodiment, the one or more interpretation techniques include a Kalman filter that predicts the next state of a variable based on input information.

In one embodiment, the edge positioning function 56 of the cellular software defined network 40 determines a refined multi-dimensional measurement m* for each vehicle 12, 30 that is part of the network of connected nodes 42 by interpolating the last multi-dimensional measurement mk from a measurement history for each vehicle 12, 30 that is part of the network of connected nodes 42. For example, the last multi-dimensional measurement mk for the ego vehicle V1 (i.e., the vehicle 12) is selected from the measurement history of [m1, m2, m3, . . . mk], where the measurement history is measured from the initial timestamp t1 to the last timestamp tk.

The refined multi-dimensional measurement m* from each of the vehicles 12, 30 that are part of the network of connected nodes 42 are then selected as input to holistically calculate the precise global position X, Y of each of the vehicles 12, 30 that are part of the network of connected nodes 42 based on a cooperative localization algorithm. As explained below, the cooperative localization algorithm holistically calculates the precise global position X, Y of each of the vehicles 12, 30 that are part of the network of connected nodes 42. Although the precise global position X, Y is expressed in two-dimensional coordinates, it is to be appreciated that the precise global position X, Y may be expressed as three-dimensional coordinates as well.

Figure 3:
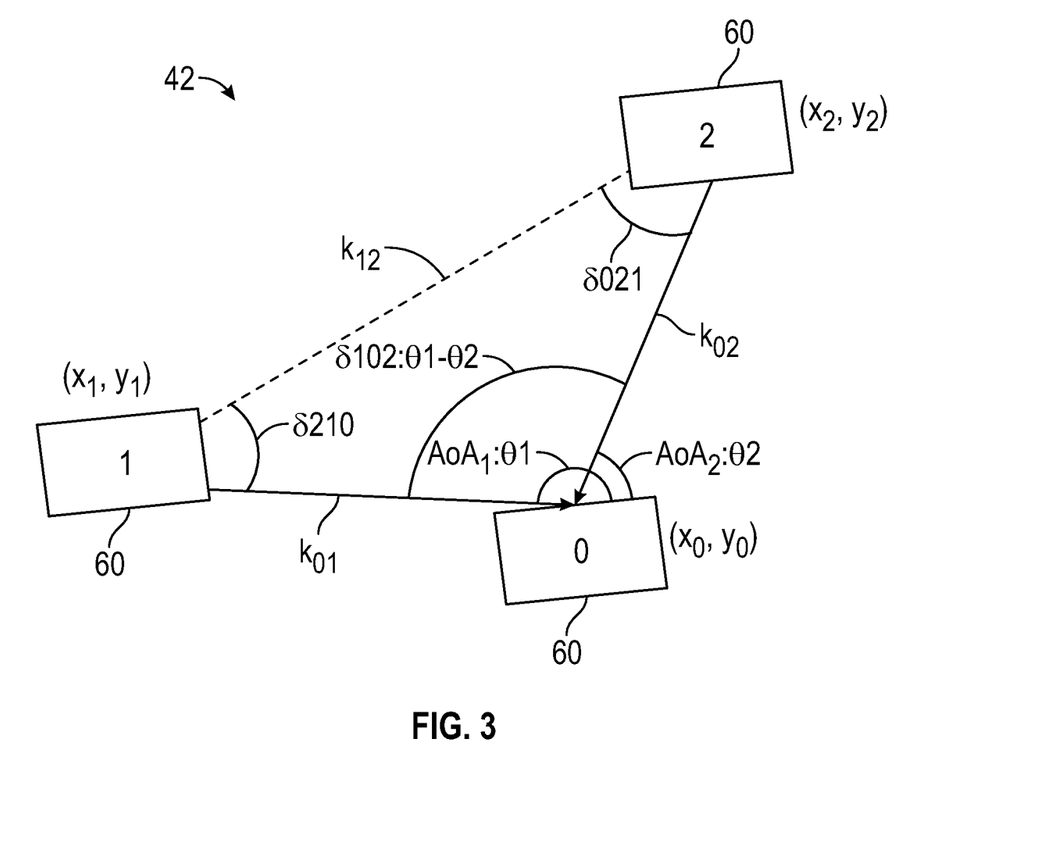
FIG. 3 is a diagram illustrating an approach for calculating a precise global position of each of the vehicles that are part of the network of connected nodes shown in FIG. 2 based on a cooperative localization algorithm, according to an exemplary embodiment.

FIG. 3 is a diagram illustrating an exemplary angle of arrival cooperative localization algorithm for holistically calculating the precise global position X, Y of each of the vehicles 12, 30 that are part of the network of connected nodes 42. The angle of arrival cooperative localization algorithm is based on a difference between two angle of arrival measurements received by one of the vehicles 12, 30 that are part of the network of connected nodes 42. As seen in FIG. 3, in one embodiment the angle of arrival cooperative localization algorithm models the network of connected nodes 42 as a plurality of nodes 60. It is to be appreciated that each node 60 represents one of the vehicles 12, 30 or a base station 38 (FIGS. 1 and 2). Specifically, each node 60 may represent an anchor node, which is one of the base stations 38 or a vehicle 12, 30 having self-positioning ability, or a blind node. A blind node represents a vehicle 12, 30 with an unknown position. The angle of arrival cooperative localization algorithm employs the relative position measurement (e.g., the angle of arrival) between a blind node and an anchor node as well as between two blind nodes.

It is to be appreciated that the blind nodes (i.e., the vehicles 12, 30) are in two-way communication with one another, while communication between the vehicle 12, 30 and one of anchor nodes (i.e., the base stations 38) are one-way with signals transmitted from base station 38 to one of the vehicles 12, 30. A minimum number of anchor nodes are required to determine the precise global position X, Y of each blind node, where the minimum number of anchor nodes depends upon the number of blind nodes that are part of the network of connected nodes 42. Depending upon the scenario, sometimes a blind node may only require a wireless connection to one anchor node. For example, if only one blind node is included as part of the network of connected nodes 42, then the network of connected nodes 42 requires at least three unique anchor nodes to determine the precise position X, Y of the blind node. It is to be appreciated that the single blind node is in wireless communication with all three anchor nodes. However, if two blind nodes are included, then the network of connected nodes 42 requires at least two unique anchor nodes. It is to be appreciated that each of the two blind nodes are in wireless communication with at least two anchor nodes. The two blind nodes are also in wireless communication with one another. If the network of connected nodes 42 includes three blind nodes, then the network of connected nodes 42 requires at least two anchor nodes. Furthermore, at least one of the blind nodes is in wireless communication with at least two anchor nodes that are part of the network of connected nodes 42. The remaining two blind nodes that are part of the network of connected nodes 42 are each in wireless communication with a unique anchor node. In other words, the remaining two blind nodes may not both be connected to the same anchor node. Furthermore, all three blind nodes are in wireless communication with one another.

If four blind nodes are included, then the network of connected nodes 42 requires at least two unique anchor nodes. Each of the four blind nodes are in wireless communication with at least one anchor node, where the four blind nodes may not have more than two anchor nodes in common with one another. For example, if the four blind nodes are represented as V1, V2, V3, V4, and if the anchor nodes are expressed as Base_vi where i represents one of the four nodes, then V1 is connected to Base_v1, V2 is connected to Base_v2, V3 is connected to Base_v3 and V4 is connected to Base_v4 as long as no more than two of Base_vi are identical. In other words, if two anchor nodes are included, then each anchor node is connected to two blind nodes. Furthermore, only one pair of blind nodes may not be in wireless communication with one another, and every other blind node is in communication with the remaining blind nodes that are part of the network of connected nodes 42. If more than four blind nodes are included as part of the network of connected nodes, then at least one of the conditions explained above that apply to one blind node, two blind nodes, three blind nodes, or four blind nodes applies. For example, if the variable S represents all the nodes in the network of connected nodes 42 where the position is either known (e.g., an anchor node) or may be calculated based on the cooperative localization algorithm (e.g., one of the blind nodes), then any blind node that is connected to more than two nodes that are part of S is also part of S.

In the diagram as shown in FIG. 3, three nodes 60 are included, and are labeled as Node 0, Node 1, and Node 2. A first $AoA_1$ is measured relative to a first angle $\theta_1$ measured between Node 1 and Node 0, and a second $AoA_2$ is measured relative to a second angle $\theta_2$ between Node 2 and Node 0. A difference between the first $AoA_1$ and the second $AoA_2$ is expressed as $\delta 102$. Although the difference between the first angle $\theta_1$ and the second angle $\theta_2$ depends upon heading, it is to be appreciated that the difference between the first $AoA_1$ and the second $AoA_2$ (which is $\delta 102$) does not depend upon orientation. That is, the angle of arrival cooperative localization algorithm is based on a difference between two angle of arrival measurements, and therefore does not require knowledge of the orientation of the nodes 60 unlike some types of cooperative localization algorithms. Therefore, a distance between each of the Nodes 1, 2, and 3 may be expressed in Equation 1 as:

$$\delta 102 = (k_{01} - k_{02})/(1 + (k_{01} * k_{02})) \quad \text{Equation 1}$$

where $k_{01}$ is the distance between Node 0 and Node 1 and $k_{02}$ is the distance between Node 0 and Node 2. Furthermore, the distance $k_{01}$ between Node 0 and Node 1 is expressed in Equation 2 as:

$$k_{01} = (y_1 - y_0)/(x_1 - x_0) \quad \text{Equation 2}$$

where $x_0, y_0$ are the coordinates for Node 0, $x_1, y_1$ are the coordinates for Node 1, and $x_2, y_2$ are the coordinates for Node 2. It is to be appreciated that separate equations may be solved for a difference $\delta 210$ between the second $AoA_2$ and a zeroth $AoA_0$ and a difference $\delta 021$ between the zeroth $AoA_0$ and the first $AoA_0$. A system of polynomial equations may then be created based on the difference $\delta 102$, the difference $\delta 210$, and the difference $\delta 021$ to solve for the precise global position X, Y for each of the vehicles 12, 30 that are part of the network of connected nodes 42.

Figure 4:
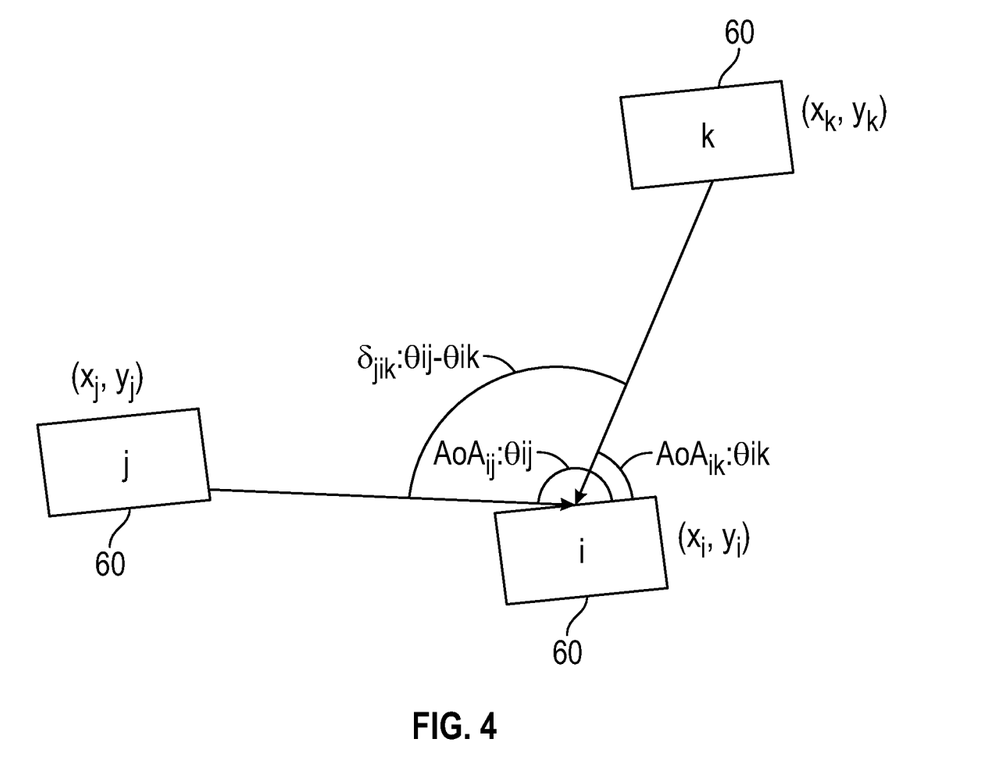
FIG. 4 is a diagram illustrating another approach for calculating the precise global position of each of the vehicles that are part of the network of connected nodes shown in FIG. 2 based on a cooperative localization algorithm, according to an exemplary embodiment.

In another embodiment as shown in FIG. 4, the nodes 60 are represented as Node i, Node j, and Node k. A first $AoA_{ij}$ is measured relative to a first angle $\theta_{ik}$ measured between Node j and Node i, and a second $AoA_{ik}$ is measured relative to a second angle $\theta_{ik}$ between Node i and Node k. A difference between the first $AoA_{ij}$ and the second $AoA_{ik}$ is expressed as $\delta jik$, and $x_i, y_i$ are the coordinates for Node i, $x_j, y_j$ are the coordinates for Node j, and $x_k, y_k$ are the coordinates for Node k. In the embodiment as shown in FIG. 4, the angle of arrival cooperative localization algorithm holistically calculates the precise position X, Y of each of the vehicles 12, 30 that are part of the network of connected nodes 42 based on the conjugate gradient method. In the example as shown in FIG. 4 assuming an M number of blind nodes 60 and an R number of anchor nodes 60, a vector $\hat{P}$ that includes the blind nodes position (i.e., p1, p2, p3, . . . pM) is expressed in Equation 3 as:

$$\hat{P} = \operatorname{argmin}_p \left( \sum_i^M \left( \sum_{j,k \in CN_i} w_{jik} (\alpha_{jik} - \beta_{jik})^2 \right) \right) \quad \text{Equation 3}$$

where $w_{jik}$ represents a weight determined based on an inverse of the angle of arrival variance and $\alpha$ and $\beta$ are represented in Equations 4, 5, 6, and 7 as:

$$\alpha_{jik} = (k_{ij} - k_{ik})/(1 + k_{ij} * k_{ik}) \quad \text{Equation 4}$$

where $k_{ik}$ represents the slope of a line connecting Node i and Node k and $k_{ij}$ represents the slope of a line connecting Node i and Node j, respectively.

$$k_{ij} = (y_j - y_i)/(x_j - x_i) \quad \text{Equation 5}$$

$$k_{ik} = (y_k - y_i)/(x_k - x_i) \quad \text{Equation 6}$$

$$\beta_{jik} = \tan(\delta jik) \quad \text{Equation 7}$$

Referring to both FIGS. 1 and 2, once the edge positioning function 56 of the cellular software defined network 40 calculates the precise position X, Y of each of the vehicles 12, 30 that are part of the network of connected nodes 42, the edge positioning function 56 then applies one or more Bayesian filtering approaches to smoothen the precise position X, Y of each of the vehicle 12, 30 that are part of the network of connected nodes 42. Some examples of Bayesian filtering approaches include, but are not limited to, a Kalman filter or a particle filter.

The edge positioning function 56 of the cellular software defined network 40 then transmits the precise global position X, Y of the vehicles 12, 30 that are part of the that are part of the network of connected nodes 42 over the V2N communication network 36 to the one or more controllers 20 of the vehicle 12. Referring specifically to FIG. 1, the one or more controllers 20 of the vehicle 12 then determine the precise position of the vehicle 12 by fusing together the precise global position X, Y of each of the vehicles 12, 30 that are part of the network of connected nodes 42 and the relative position measurements indicative of the position of one of the surrounding vehicles 30 relative to the vehicle 12. Specifically, the one or more controllers 20 of the vehicle 12 first save the relative position measurements indicative of the surrounding vehicles 30 relative to the vehicle 12 in memory, where each relative position measurement includes a unique timestamp. The one or more controllers 20 compare a timestamp of the most recent precise global position X, Y of the vehicle 12 with the unique timestamp of each of the relative position measurements saved in the memory of the one or more controllers 20. The one or more controllers 20 then select the relative position measurements saved in memory that include the unique timestamp that are more recent when compared to the timestamp of the most recent precise global position X, Y of the vehicle 12. The one or more controllers 20 then fuse together the relative position measurements having the unique timestamp that is more recent than the timestamp of the most recent precise global position X, Y of the vehicle 12 with the most recent precise global position X, Y of the vehicle 12 to determine the precise position of the vehicle 12.

Figure 5:
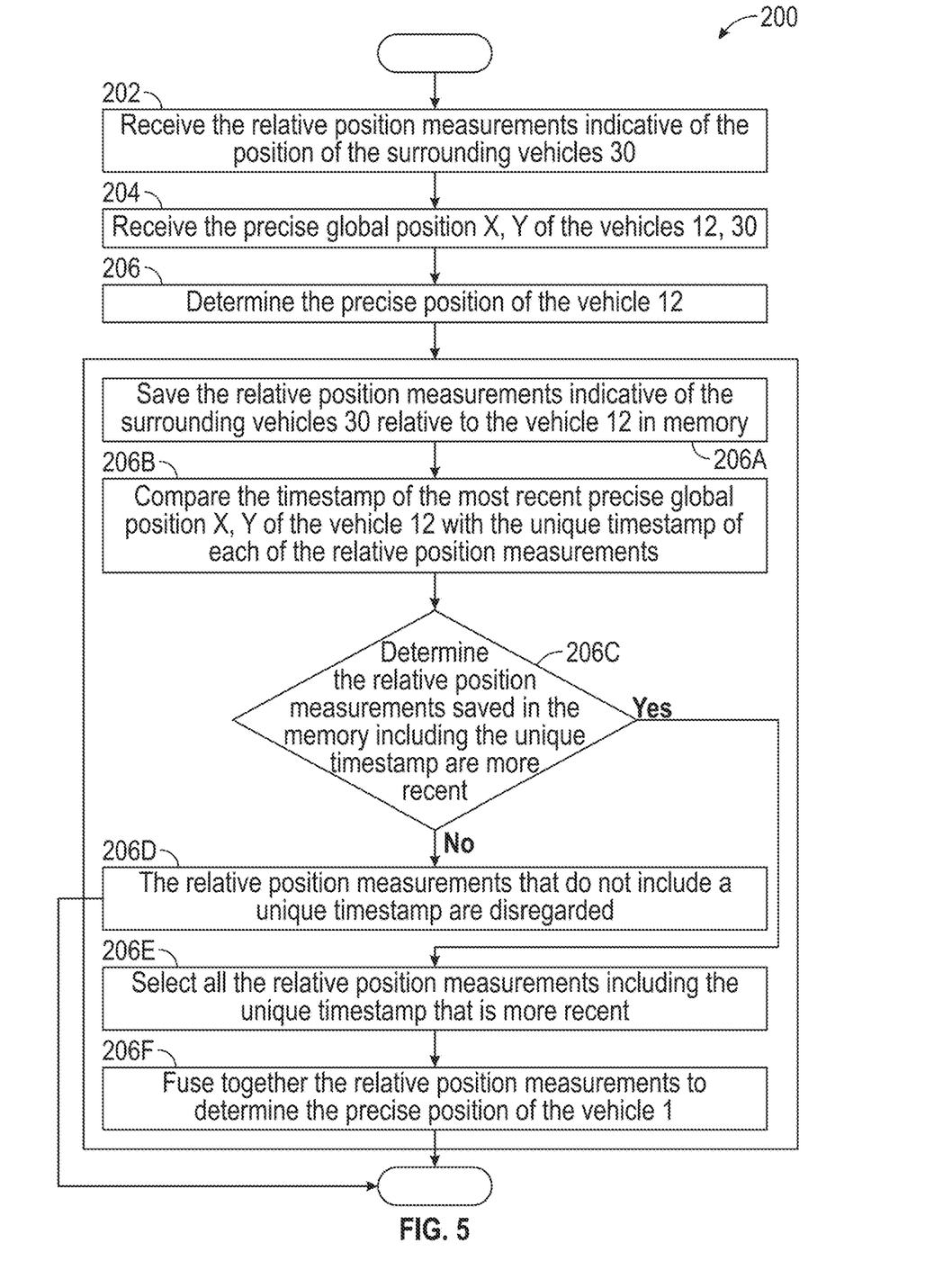
FIG. 5 is a process flow diagram illustrating a method for determining a precise position of the vehicle by the hybrid positioning system, according to an exemplary embodiment.

FIG. 5 is an exemplary process flow diagram illustrating a method 200 of determining the precise position of the vehicle 12 (FIG. 1) by the hybrid positioning system 10. Referring generally to FIGS. 1-2 and 5, the method 200 may begin at block 202. In block 202, the one or more controllers 20 of the vehicle 12 receive the relative position measurements indicative of the position of the surrounding vehicles 30 relative to the vehicle 12 over the V2V communication network 32. The method 200 may then proceed to block 204.

In block 204, the one or more controllers 20 receive the precise global position X, Y of the vehicles 12, 30 that are part of the that are part of the network of connected nodes 42 over the V2N communication network 36 from the edge positioning function 56 of the cellular software defined network 40. The method 200 may then proceed to block 206.

In block 206, the one or more controllers 20 of the vehicle 12 determine the precise position of the vehicle 12 by fusing together the precise global position X, Y of each of the vehicles 12, 30 that are part of the network of connected nodes 42 and the relative position measurements indicative of the position of one of the surrounding vehicles 30 relative to the vehicle 12. Specifically, subblocks 206A-206E describe fusing together the precise global position X, Y of each of the vehicles 12, 30 that are part of the network of connected nodes 42 and the relative position measurements indicative of the position of one of the surrounding vehicles 30 relative to the vehicle 12.

In subblock 206A, the one or more controllers 20 of the vehicle 12 save the relative position measurements indicative of the surrounding vehicles 30 relative to the vehicle 12 in memory, where each relative position measurement includes a unique timestamp. The method 200 may then proceed to subblock 206B.

In subblock 206B, the one or more controllers 20 compare the timestamp of the most recent precise global position X, Y of the vehicle 12 with the unique timestamp of each of the relative position measurements saved in the memory. The method 200 may then proceed to decision block 206C.

In decision block 206C, the one or more controllers 20 determine the relative position measurements saved in the memory including the unique timestamp that are more recent when compared to the timestamp of the most recent precise global position X, Y of the vehicle 12. In subblock 206D, the relative position measurements that do not include a unique timestamp that is more recent when compared to the timestamp of the most recent precise global position X, Y of the vehicle 12 are disregarded, and the method 200 may then terminate. In subblock 206E, the one or more controllers 20 select all the relative position measurements including the unique timestamp that is more recent when compared to the timestamp of the most recent precise global position X, Y of the vehicle 12. In subblock 206F, the one or more controllers 20 fuse together the relative position measurements having the unique timestamp that are more recent than the timestamp of the most recent precise global position X, Y of the vehicle 12 with the most recent precise global position X, Y of the vehicle 12 to determine the precise position of the vehicle 12. The method 200 may then terminate.

Referring generally to the figures, the disclosed hybrid positioning system provides various technical effects and benefits. Specifically, the hybrid positioning system fuses together the relative position measurements of the surrounding vehicles received from the V2V communication network, which are received by the vehicle in real-time, with the precise global position of the vehicle holistically calculated by the edge positioning function. Combining the relative position measurements with the precise global position results in both submeter-level accuracy as well as high update frequency. The relative position measurements received by the V2V communication network mitigate the effects of network latency, which is experienced by the precise global position that is holistically calculated by the edge positioning function and provides the high update frequency as well. Furthermore, the precise global position of the vehicle calculated by the edge positioning function includes submeter-level accuracy, and thereby improves the overall accuracy of the precise position of the vehicle. It is also to be appreciated that the angle of arrival cooperative localization algorithm is based on a difference between two angle of arrival measurements and does not require knowledge of the orientation of the nodes, unlike some other angle of arrival cooperative localization algorithms currently available. Finally, the hybrid positioning system synchronizes the relative position measurements and the stationary position measurements, which may have different data rates and starting times, onto the same time frame based on one or more interpolation techniques.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid positioning system for a vehicle, comprising:
one or more controllers in wireless communication with a plurality of surrounding vehicles located in an environment surrounding the vehicle and a cellular software defined network including an edge positioning function, the one or more controllers executing instructions to:
receive, from the plurality of surrounding vehicles, relative position measurements that are each indicative of a position of one of the plurality of surrounding vehicles relative to the vehicle, wherein the relative position measurements are received by the one or more controllers in real-time;

receive a precise global position of the vehicle and the plurality of surrounding vehicles from the edge positioning function of the cellular software defined network; and fuse together the relative position measurements and the precise global position of the vehicle to determine a precise position of the vehicle.

2. The hybrid positioning system of claim 1, wherein the precise global position of the vehicle and the plurality of surrounding vehicles are holistically calculated based on a cooperative localization algorithm by the edge positioning function.

3. The hybrid positioning system of claim 2, wherein the cooperative localization algorithm is an angle of arrival cooperative localization algorithm that is based on a difference between two angle of arrival measurements received by one or more of the following: the vehicle and the plurality of surrounding vehicles.

4. The hybrid positioning system of claim 3, wherein the angle of arrival cooperative localization algorithm holistically calculates the precise global position of the vehicle and the plurality of surrounding vehicles based on the conjugate gradient method.

5. The hybrid positioning system of claim 1, wherein the one or more controllers fuse together the relative position measurements and the precise global position of the vehicle by:

saving the relative position measurements indicative of the surrounding vehicles relative to the vehicle in memory, wherein each relative position measurement includes a unique timestamp.

6. The hybrid positioning system of claim 5, wherein the one or more controllers fuse together the relative position measurements and the precise global position of the vehicle by:

comparing a timestamp of a most recent precise global position of the vehicle with the unique timestamp of each of the relative position measurements saved in the memory;

selecting all relative position measurements having the unique timestamp that is more recent compared to the timestamp of the most recent precise global position of the vehicle; and fusing together the relative position measurements having the unique timestamp that is more recent than the timestamp of the most recent precise global position of the vehicle with the most recent precise global position of the vehicle.

7. The hybrid positioning system of claim 1, wherein one or more controllers are in wireless communication with the plurality of surrounding vehicles by a vehicle-to-vehicle (V2V) communication network.

8. The hybrid positioning system of claim 1, wherein the one or more controllers are in wireless communication with the cellular software defined network by a vehicle-to-network (V2N) communication network.

9. The hybrid positioning system of claim 8, wherein the V2N communication network is based on a cellular communication protocol.

10. The hybrid positioning system of claim 1, wherein the hybrid positioning system is part of an automated driving system (ADS) or an advanced driver assistance system (ADAS).

11. The hybrid positioning system of claim 1, wherein the relative position measurements include one or more of the following: an angle of arrival (AoA), a time of arrival (ToA), and a round-trip time (RTT).

12. A method of determining a precise position of a vehicle by a hybrid positioning system, the method comprising:

receiving, by one or more controllers from a plurality of surrounding vehicles, relative position measurements that are each indicative of a position of one of the plurality of surrounding vehicles relative to the vehicle, wherein the relative position measurements are received by the one or more controllers in real-time;

receiving, by the one or more controllers, a precise global position of the vehicle and the plurality of surrounding vehicles from an edge positioning function of a cellular software defined network; and fusing together the relative position measurements and the precise global position of the vehicle to determine the precise position of the vehicle.

13. The method of claim 12, wherein fusing together the relative position measurements and the precise global position of the vehicle includes:

saving the relative position measurements indicative of the plurality of surrounding vehicles relative to the vehicle in memory, wherein each relative position measurement includes a unique timestamp.

14. The method of claim 13, wherein fusing together the relative position measurements and the precise global position of the vehicle includes:

comparing a timestamp of a most recent precise global position of the vehicle with the unique timestamp of each of the relative position measurements saved in the memory;

selecting all relative position measurements having the unique timestamp that is more recent compared to the timestamp of the most recent precise global position of the vehicle; and fusing together the relative position measurements having the unique timestamp that is more recent than the timestamp of the most recent precise global position of the vehicle with the most recent precise global position of the vehicle.

15. A hybrid positioning system for a vehicle, comprising:

one or more controllers in wireless communication with a plurality of surrounding vehicles located in an environment surrounding the vehicle by a V2V communication network and a cellular software defined network including an edge positioning function by a V2N communication network, the one or more controllers executing instructions to:

receive, from the plurality of surrounding vehicles, relative position measurements that are each indicative of a position of one of the plurality of surrounding vehicles relative to the vehicle, wherein the relative position measurements are received by the one or more controllers in real-time;

receive a precise global position of the vehicle and the plurality of surrounding vehicles from the edge positioning function of the cellular software defined network, wherein the precise global position of the vehicle and the plurality of surrounding vehicles are holistically calculated based on a cooperative localization algorithm by the edge positioning function; and fuse together the relative position measurements and the precise global position of the vehicle to determine a precise position of the vehicle.

16. The hybrid positioning system of claim 15, wherein the cooperative localization algorithm is an angle of arrival cooperative localization algorithm that is based on a difference between two angle of arrival measurements received by one or more of the following: the vehicle and the plurality of surrounding vehicles.

17. The hybrid positioning system of claim 16, wherein the angle of arrival cooperative localization algorithm holistically calculates the precise global position of the vehicle and the plurality of surrounding vehicles based on the conjugate gradient method.

18. The hybrid positioning system of claim 15, wherein the one or more controllers fuse together the relative position measurements and the precise global position of the vehicle by:
  saving the relative position measurements indicative of the surrounding vehicles relative to the vehicle in memory, wherein each relative position measurement includes a unique timestamp.

19. The hybrid positioning system of claim 18, wherein the one or more controllers fuse together the relative position measurements and the precise global position of the vehicle by:
  comparing a timestamp of a most recent precise global position of the vehicle with the unique timestamp of each of the relative position measurements saved in the memory;
  selecting all relative position measurements having the unique timestamp that is more recent compared to the timestamp of the most recent precise global position of the vehicle; and
  fusing together the relative position measurements having the unique timestamp that is more recent than the timestamp of the most recent precise global position of the vehicle with the most recent precise global position of the vehicle.

20. The hybrid positioning system of claim 15, wherein the V2N communication network is based on a cellular communication protocol.

* * * * *